United States Patent [19]
Williams

[11] Patent Number: 5,715,861
[45] Date of Patent: Feb. 10, 1998

[54] HYDRAULICALLY CUSHIONED PRESSURE RELIEF VALUE

[75] Inventor: Richard D. Williams, Sugar Land, Tex.

[73] Assignee: Retsco, Inc., Houston, Tex.

[21] Appl. No.: 531,094

[22] Filed: Sep. 20, 1995

[51] Int. Cl.$^6$ .................................................. F16K 17/00
[52] U.S. Cl. ................................... 137/467; 137/514.5
[58] Field of Search .............................. 137/467, 514.5

[56] References Cited

U.S. PATENT DOCUMENTS

| | | | |
|---|---|---|---|
| 2,973,776 | 3/1961 | Allen | 137/467 |
| 2,973,777 | 3/1961 | Troxell, Jr. | 137/467 |
| 3,022,730 | 2/1962 | Filstrup | 137/467 X |
| 3,086,551 | 4/1963 | Gordon | 137/514.5 |
| 3,095,901 | 7/1963 | Larson et al. | 137/514.5 X |
| 4,638,978 | 1/1987 | Jordan | 254/228 |

FOREIGN PATENT DOCUMENTS 160533  9/1953  Australia .............................. 137/467

*Primary Examiner*—Stephen M. Hepperle
*Attorney, Agent, or Firm*—Jenkens & Gilchrist, P.C.

[57] ABSTRACT

A pressure relief valve has a moveable piston disposed in a body between inlet and outlet ports in the body. A volumetrically variable enclosed chamber is formed within the body with a portion of the chamber being defined by an upper surface of the piston. At least one aperture extends through the head of the piston providing a fluid passageway between an inlet port of the valve and the enclosed chamber. Fluid captured within the enclosed chamber permits initial rapid movement of the piston head to an open, or relieved, position in the event of a sharp increase in system pressure and provides a hydraulic cushion whereby impact shock of the head against internal valve components is attenuated.

5 Claims, 3 Drawing Sheets

5,715,861

HYDRAULICALLY CUSHIONED PRESSURE RELIEF VALUE

TECHNICAL FIELD

This invention relate generally to pressure relief valves and more particularly to quick-opening, or pop-off type, pressure relief valves.

BACKGROUND ART

Pressure relief valves are important elements in fluid flow systems in which undesirable high pressure may occur. In such systems, overpressure may damage valuable processing equipment or even cause rupture of weak components of the system. In many applications, it is desirable that when a predesignated threshold pressure is exceeded, the pressure relief valve open very quickly, i.e., virtually instantaneously, to relieve system pressure. Pressure relief valves having this capability are commonly referred to as "pop-off" valves because of their rapid opening action. In carrying out the rapid opening of the valve, movable port-blocking elements within the valve, such as a plug or piston, are subjected to high acceleration and velocity, resulting in severe impact forces being imposed on the piston and other elements of the valve when the moving member reached its limit of travel away from the port-blocking position.

Heretofore, cushion members formed of rubber and similar resilient elastomeric materials have been used to attenuate the impact of the flow control piston subsequent to its rapid displacement from the flow-blocking position. Examples of such valves and rubber cushion members are disclosed in U.S. Pat. Nos. 2,973,776 and 2,973,777 respectively issued on Mar. 7, 1961 to Herbert Allen and John N. Troxell, Jr. While the annular elastomeric cushion rings do provide effective initial shock attenuation, the rings, aided by the initial drop in pressure at the inlet port when the piston is moved from its blocking position, promote undesirable rebounding of the piston, which inhibits the free flow of fluid to the outlet port, and impose additional repetitive shock forces on the entire valve assembly. Furthermore, the rebounding action attributed to the resilient rings often resulted in the relief valve resetting itself before release of the excess pressure, only to be triggered soon thereafter by the unrelieved pressure. This opening and unintended resetting cycle could continue for a significant period of time until it was detected, and was a major contributor to wear and failure of the internal linkage mechanism and other components of the valve.

The present invention is directed to overcoming the problems set forth above. It is desirable to have a quick-opening pressure relief valve wherein the initial rapid movement of the relief port opening member is attenuated as it approaches its limit of travel toward the full open position without introducing any rebound forces into the movement of the port opening member. It is also desirable to have such a valve that is not prone to unintended reset subsequent to opening of the port opening member.

SUMMARY OF THE INVENTION

In accordance with one aspect of the present invention, a pressure relief valve includes a body having an inlet port, and outlet port, and interior walls that partially define an enclosed chamber. The valve also has a piston, disposed in the body, that is moveable between a first position at which it is disposed in fluid flow-blocking relationship between the inlet and outlet ports, and a second position at which the piston is removed from its first position. The piston has a head with opposed end surfaces, one of which defines a portion of the enclosed chamber, and at least one fluid flow passageway that extends through the head and provides fluid communication between the inlet port and the enclosed chamber. The piston also has a stem extending outwardly form the piston head. The valve also includes means for urging the piston into the first position and separate means for selectively engaging and disengaging the means for urging the piston into the first position.

In another aspect of the present invention, the pressure relief valve includes a bonnet attached to the body with a stem bushing disposed in the bonnet in spaced relationship with the head portion of the piston. The stem bushing has a surface that defines a portion of the enclosed chamber, and an internal bore that slidably supports the stem.

BEST MODE FOR CARRYING OUT THE INVENTION

Figure 1:
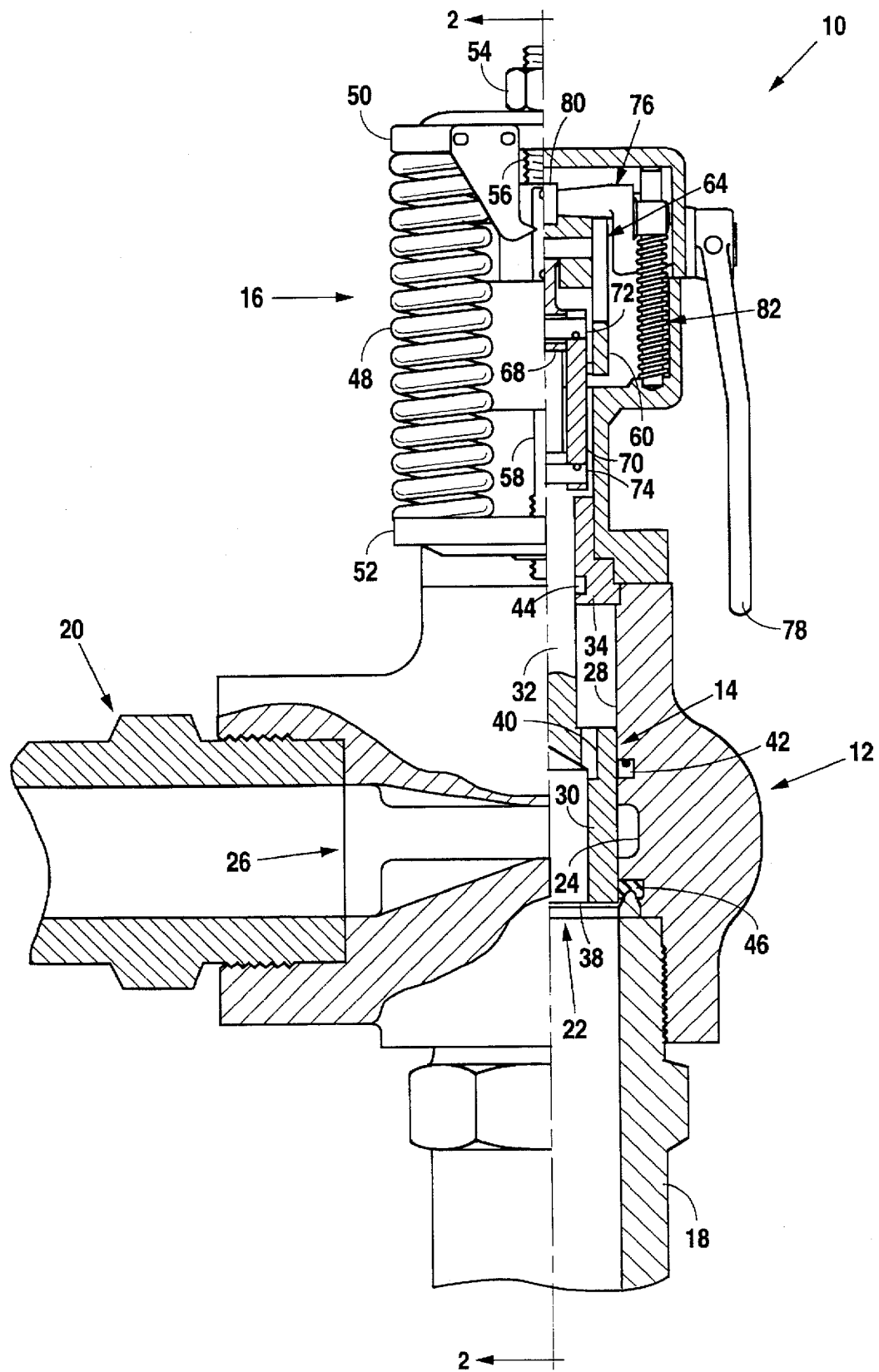
FIG. 1 is split elevational/sectional view of the pressure relief valve embodying the present invention.
Figure 2:
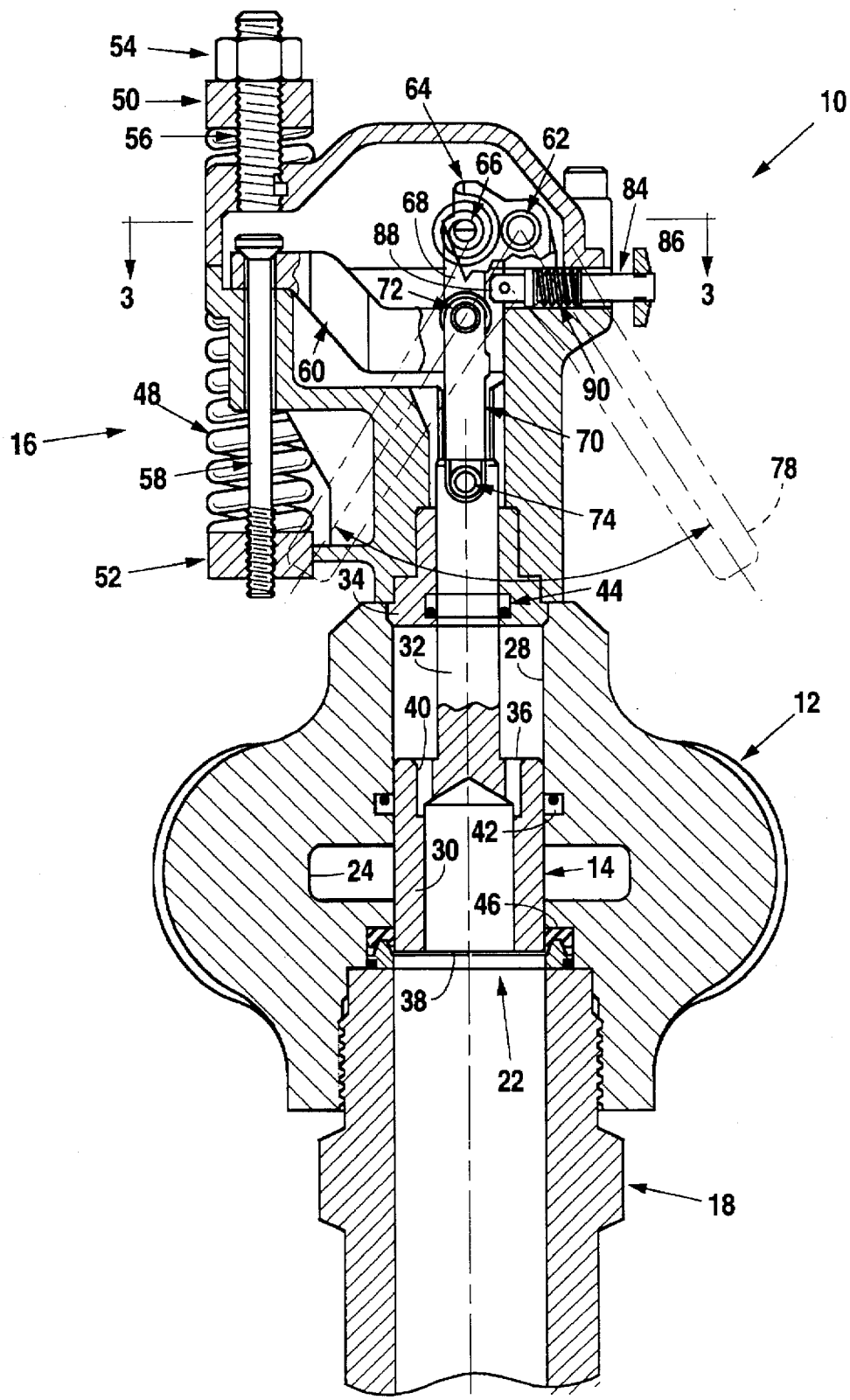
FIG. 2 is a longitudinal cross-sectional view of the pressure relief valve embodying the present invention, taken along the line 2—2 of FIG. 1.
Figure 3:
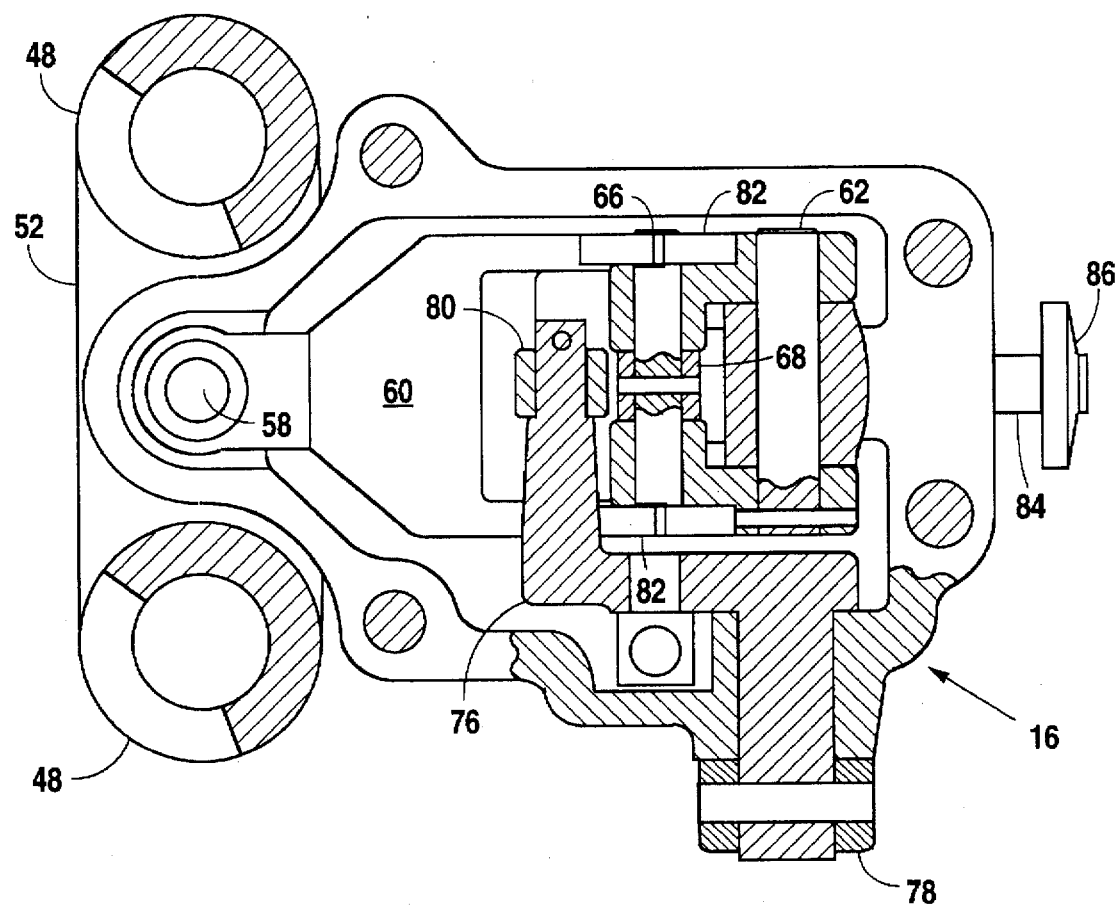
FIG. 3 is a transverse cross-sectional view of the pressure relief valve embodying the present invention, taken along the line 3—3 of FIG. 2.

In the preferred embodiment of the present invention, shown in FIGS. 1–3, a pressure relief valve 10 has a body 12, a piston 14 movably disposed within the body 12, and a bonnet assembly 16. The relief valve 10 is typically connected to a line conduit 18 in fluid communication with a fluid system containing a fluid under pressure, and a discharge conduit 20 in fluid communication with a fluid containment or storage structure, sump, drain line, or other arrangement for receiving fluid relieved from the fluid system.

The valve body 12 has an inlet port 22 that is adapted to receive the line conduit 18, and an internally disposed annular chamber 24 in fluid communication with an outlet port 26 that is adapted to receive the discharge conduit 20. The body 12 also has an internal bore providing an interior cylindrical wall surface that partially defines an enclosed chamber 28, the features and function of which are disclosed below in more detail.

The piston 14 has a head 30 and an elongated stem 32 extending outwardly from head 30. A stem bushing 34 is mounted in the bonnet 16 such that the bottom surface of the bushing 34 is spaced from the piston head 30 when the piston 14 is at a first, or set, position as shown in FIGS. 1 and 2. At the first position, the head 30 blocks the flow of fluid between the inlet port 22 and the outlet port 26. The head has an annular upper surface 36 that defines a lower wall of the enclosed chamber 24, and a stepped lower surface 38 facing the inlet port 22 of the valve body 12.

Importantly, the piston 14 has one or more apertures 40 that extend through the head 30 of the piston 14 providing a fluid flow path between the inlet port 22 and the enclosed chamber 28. The key function of the apertures 40 is to provide a controlled flow path for fluid to pass into the chamber 28 when the piston 14 is at its set or first position, and a like controlled flow path for fluid to pass from the chamber 28 when the piston 14 is moved from its above-described first position to a second, or relief, position at which the piston head 30 is moved from its flow blocking position between the inlet and outlet ports, 22,26. Although the second position is not shown in the drawings, it can be readily understood that when the piston 14 is raised to the second position, there is essentially no impediment to fluid flow between the line conduit 18, which typically contains pressurized fluid, and the discharge conduit 20 which is typically open to atmosphere, or ambient pressure.

In an illustrative example, the pressure relief valve 10 is installed in a system for pumping drilling mud composed of water, clay and chemical additives, down through the inside of a drill pipe of an oil well drilling operation. The drilling mud is pumped at very high pressure, for example up to 7,500 psi (51,675 kPa), so that the mud is forced out through a bit at the lower end of the drill pipe and returned to the surface, carrying rock cuttings from the well. Typically, the drilling mud may have a viscosity of about 50 second funnel viscosity, and the line conduit 18 in fluid-pressure communication with the pressurized drilling mud has a diameter of about 2.3 in (5.8 cm). In this illustrative application, the lower stepped surface 38 of the piston head 30 has a surface area substantially equal to that of the cross-sectional area of the line conduit 18. The piston stem 32 has a diameter of about 1.062 in (2.70 cm), thus reducing the surface area of the upper surface 36 of the piston head 30 to an area significantly less than the area of the stepped lower surface 38.

In normal operation, with the line, or system, pressure at a pressure less than the predetermined value at which it is desired to relieve system pressure, the piston 14 is at its first position. At this position, fluid will flow from the inlet port 22, through the apertures 40 to the enclosed chamber 28, until there is essentially equal pressure on both sides of the head 30. However, when the line pressure exceeds the predetermined value, typically as an almost instantaneous pressure spike resulting from line blockage, the valve 10 will trip in the manner described below, rapidly raising the piston head 30 away from its first position. Initially, the piston 14 will raise very rapidly, thereby decreasing the volume of the enclosed chamber 28, until the pressure in the enclosed chamber 28 is greater than the pressure of the fluid at the stepped lower surface 38 of the piston head 30. As the head 30 continues to move upwardly toward the stem bushing 34, the volume of the enclosed chamber 28 continues to decrease and, since the drilling mud of this example is essentially a noncompressible fluid, the rate of upward movement of the piston 14 is restricted by the rate at which fluid can be expelled from the enclosed chamber 28, through the apertures 40. Thus, the impact of the piston head 30 against the stem bushing 34, at the upward limit of travel of the head 30 is cushioned, and no rebound forces are imposed on the piston head 30 that would cause it move toward the closed position. Depending upon the viscosity of the working fluid, both the number and diameter of the apertures will vary and can be readily determined by one of ordinary skill in the art of fluid mechanics. In the above-described illustrative application in which drilling mud is the working fluid, (four) apertures 40, each having a diameter of about 0.5 in (1.27 cm), are equidistantly radially spaced from each other around the longitudinal centerline of the piston head 30. Alternatively, the apertures 40 could be formed by drilling the desired diameter orifice through replaceable plugs that could be selectively inserted into the piston head 30. Such an arrangement would provide appropriately sized apertures for varying fluid viscosity applications, even allowing some of the plugs to have a solid construction if fewer apertures were required.

A first, or intermediate piston seal member 42 is disposed in the body 12 at a position between the outlet port 26 and the enclosed chamber in sealing relationship about the piston head 30 to prevent uncontrolled fluid flow between the outlet port 26 and the enclosed chamber 28. A second, or upper, seal member 44 is disposed in the interior bore of the stem bushing 34 to provide a seal around the valve stem 32 and prevent the leakage of fluid from the enclosed chamber 28, around the stem 32. A lower, or third, piston seal member 46 is disposed in the body 12 at a position between the inlet port 22 and the outlet port 26 to provide a seal around the head 30 and prevent leakage between the ports 22,26 when the piston 14 is deployed in its normal, or first, position.

The pressure relief valve 10 embodying the present invention also has a first means for urging the piston into the above-described first position illustrated in FIGS. 1 and 2. With reference to the drawings, the first means includes a pair of load springs 48 that are controllably compressed between upper and lower spring retainers 50,52. The upper retainer 50 is adjustably mounted on the bonnet 16 by an adjustable nut 54 threadably secured to an adjusting stud 56. The lower end of a load screw 58 is secured to the lower retainer 52 and has an enlarged head at its upper end that fits into a mating socket provided at one end of a pivot crank member 60 and, as a result of the downward force applied by the compression springs 48 on the lower spring retainer 52, urges the socket end of the pivot crank 60 in a downward direction. The pivot crank member 60 is pivotally mounted on a crank pivot pin 62. The second end of the crank member 60 biasedly engages the outer ends of two spiral springs 64 that are concentrically mounted on a top crank pin 66 that is rotanably mounted in the second end of the pivot crank 60. The inner ends of the two spiral springs 64 are secured to the top crank pin 66, such that a small bias force acting in a counterclockwise direction as viewed in FIG. 2, is applied to the top crank pin 66. The upper end of an upper link 68 is attached to the top crank pin 66 and accordingly moves in concert with the pin 66 about its axis. The lower end of the upper link 68 is pivotally interconnected with the upper end of a lower link 70 by an upper link pin 72. The lower end of the lower link 70 is pivotally attached to an upper end of the piston stem 32 by a lower link pin 74.

When the valve 10 is in its operatively set position, with the piston head 30 at the first, or flow-blocking position, the upper and lower links 68,70 are vertically aligned thereby forming an essentially rigid line such that the compression force of the springs 48 is transferred through the load screw 58 to the pivot crank 60, thence through the top crank pin 66 to the aligned upper and lower links 68,70 and then to the upper end of the piston stem 32. If the pressure against the lower stepped surface 38 of the piston head 30 increases to a value greater than the compressive force applied to the upper end of the piston stem 32 by the load springs 48, the second end of the pivot crank 60 will be forced to rotate in a clockwise direction, as viewed in FIG. 2, causing the upper end of the upper link 68 to be moved out of alignment with the lower link pin 70. At this instant, the upper link pin 72 will immediately move leftwardly, causing the upper and lower links 68,70 to be moved out of vertical alignment, and thereby allowing the piston stem 32 to move upwardly. When the links 68,70 are moved out of alignment, the upward movement of the piston 14 is, as described above, impeded only by the flow of fluid from the enclosed chamber 28 through the apertures, or orifices, 40.

Because the upward movement of the piston 14 is hydraulically cushioned, there are no rebound, or "bounce" forces imposed on the piston 14, and accordingly the piston will not undesirably reset itself. The valve 10 embodying the present invention provides a second means for resetting the valve, i.e., for engaging the first means for urging the piston 14 into the first position. The second means includes a reset crank 76 that is rotatably mounted in the bonnet 16, and has a handle 78 at one end extending externally of the bonnet 16 and a roller 80 at a second end disposed within the bonnet 16. The reset crank 76 is biased by a reset crank spring 82 whereby the roller 80 at the second end of reset crank 76 is maintained in a spaced, or clearance, position from the upper link 68, even when the upper link 68 is displaced from vertical alignment with the lower link 70, i.e., when the piston 14 is at the second position.

To reset the valve 10, pressure must be relieved from the inlet port 22, whereupon the reset handle 78 can be manually rotated counterclockwise to the rightward position shown in FIG. 2. This manual movement of the reset handle will cause the roller 80 to move the upper link 68 back into vertical alignment with the lower link 70.

It may also be desirable, for testing, repair or other purposes, to disengage the first means, i.e. release the force of the load springs 48 acting on the upper end of the piston stem 32. For this purpose, the present invention includes a third means for disengaging the first means for urging the piston 14 into the first position. The third, or disengaging, means includes a release shaft 84 slidably mounted in a wall of the bonnet 16. A button head 86 is provided on an end of the release shaft 84 extending outwardly of the bonnet 16. A second end 88 of the release shaft 84 is disposed internally within the bonnet 16 and is maintained in biased abutting contact with the upper link 68 by a spring 90 circumferentially disposed about the shaft 84. By pushing inwardly on the release button 86, the second end 88 of the shaft is moved against the upper link 68, causing it to be displaced leftwardly as viewed from the FIG. 2 perspective. The leftward movement of the upper link 68 moves it out of vertical alignment with lower link 70, causing the links 68,70 to fold with respect to each other, thereby relieving the load spring bias force imposed against the upper end of the piston stem 32.

Industrial Applicability

The pressure relief valve 10 embodying the present invention is particularly suitable for use in harsh environments, such as oil well drilling, in which pumping systems transferring highly viscous fluids at high pressures are subject to blockage or other overpressure inducing events. If not quickly relieved, such overpressure will cause severe damage to the system. The pressure relief valve 10 not only provides instantaneous pressure relief when a predetermined pressure is exceeded, but also prevents inadvertent, and highly undesirable, resetting of the valve before the fluid system returns to its intended operating pressure.

Furthermore, the pressure relief valve 10 embodying the present invention advantageously cushions the impact of the piston 14 when valve 10 opens. The piston head structure providing the cushioned impact feature is economical to produce and does not require extra components such as the rubber rings used heretofore for such purposes.

Other aspects, features and advantages of the present invention can be obtained from a study of this disclosure with the appended claims.

What is claimed is:

1. A pressure relief valve, comprising:
    a body having an inlet port, an outlet port, and an interior wall partially defining an enclosed chamber;
    a piston disposed in said body and moveable between a first position at which said piston is disposed in fluid flow-blocking relationship between said inlet port and said outlet port of the body and a second position at which said piston is removed from said fluid flow-blocking position, said piston having a head with opposed end surfaces one of which defines a portion of said enclosed chamber and at least one fluid flow passageway extending through said head and providing fluid communication between said inlet port and said enclosed chamber in said body, and an elongated stem extending outwardly from said head;
    a bonnet attached to said body;
    a stem bushing disposed in said bonnet in spaced relationship with the head of said piston, said stem bushing having a surface defining another portion of said enclosed chamber and an internal bore in which said stem is slidably supported;
    means for urging said piston into said first position;
    means for selectively disengaging said means for urging said piston into said first position; and,
    means for selectively engaging said means for urging said piston into said first position.

2. A pressure relief valve, as set forth in claim 1, wherein said valve has a first seal member disposed in said body in sealing relationship with said piston at a position between said outlet port and said enclosed chamber, and a second seal member disposed in said stem bushing in sealing relationship with said stem.

3. A pressure relief valve, as set forth in claim 1, wherein said means for urging said piston to said first position includes at least one spring and at least two pivotally interconnected link members operatively disposed between said spring and said stem.

4. A pressure relief valve, as set forth in claim 3, wherein said means for selectively disengaging said means for urging said piston into said first position includes a release shaft extending through a wall of said bonnet and having one end disposed in biased abutting contact with one of said pivotally interconnected link members when said piston is at said first position.

5. A pressure relief valve, as set forth in claim 3, wherein said means for selectively engaging said means for urging said piston into said first position includes a reset lever pivotably mounted in said bonnet and having a handle disposed at a first end extending outwardly of said bonnet and a second end in biased abutting contact with one of said pivotally interconnected links when said piston is at said second position.

* * * * *